United States Patent
Suzuki et al.

(10) Patent No.: US 7,822,575 B2
(45) Date of Patent: Oct. 26, 2010

(54) TILT-ANGLE DETECTING METHOD AND APPARATUS FOR A MOTORCYCLE

(75) Inventors: Osamu Suzuki, Saitama (JP); Kaoru Hatanaka, Saitama (JP); Syunichi Miyagishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 12/214,489

(22) Filed: Jun. 19, 2008

(65) Prior Publication Data

US 2009/0024350 A1  Jan. 22, 2009

(30) Foreign Application Priority Data

Jul. 19, 2007  (JP)  .............................. 2007-188193

(51) Int. Cl.
*G01P 15/00* (2006.01)
(52) U.S. Cl. ........................ 702/151; 702/141; 702/142; 180/282; 701/41
(58) Field of Classification Search ................. 180/219, 180/41, 282; 280/5.502–5.509, 5.513; 701/1, 701/38, 30, 41, 72, 80; 702/141–142, 150, 702/151
See application file for complete search history.

(56) References Cited

U.S. PATENT DOCUMENTS 5,217,087 A    6/1993   Ikegami et al.

2006/0176162 A1   8/2006   Mickley et al.

FOREIGN PATENT DOCUMENTS

| DE | 691 04 943 T2 | 3/1995 |
| DE | 103 50 047 A1 | 5/2005 |
| DE | 10 2004 060 292 A1 | 7/2006 |
| DE | 10 2005 002 239 A1 | 7/2006 |
| JP | 05-208635 | 8/1993 |

*Primary Examiner*—Drew A Dunn
*Assistant Examiner*—Hien X Vo
(74) *Attorney, Agent, or Firm*—Carrier, Blackman & Associates P.C.; William D. Blackman; Joseph P. Carrier

(57) ABSTRACT

A vehicular tilt-angle detecting apparatus includes a steering-angle sensor, a vehicle speed sensor, a lateral-G sensor, a turning-radius calculation unit, a base tilt-angle calculation unit, a transient tilt-angle calculation unit, and a transient tilt angle calculation unit. The turning-radius calculation unit determines a turning radius corresponding to a steering angle based on a predetermined relationship between a steering angle and a turning radius. The base tilt-angle calculation unit calculates a current instantaneous tilt angle of a vehicle body during short-term steady-state turning based on the turning radius and the vehicle speed. The transient tilt-angle calculation unit corrects the initial calculated tilt angle of the vehicle body based on a transient turning radius when a variation of the steering angle is equal to or greater than a predetermined value. When the variation is less than the predetermined value, the transient tilt-angle calculation unit calculates the lateral-G corrected transient tilt angle.

14 Claims, 5 Drawing Sheets

TILT-ANGLE DETECTING METHOD AND APPARATUS FOR A MOTORCYCLE

CROSS-REFERENCE TO RELATED APPLICATIONS

The present application claims priority under 35 USC §119 based on Japanese patent application No. 2007-188193, filed on Jul. 19, 2007. The entire subject matter of this priority document is incorporated by reference herein.

BACKGROUND OF THE INVENTION

1. Field of the Invention

The present invention relates to a tilt-angle detecting apparatus for a motorcycle, and a method of detecting a tilt angle in a motorcycle. More particularly, the present invention relates to a tilt-angle detecting apparatus which obtains a tilt angle of a vehicle body based on a vehicle speed and a steering angle during a turning operation of the motorcycle while driving.

2. Description of the Background Art

There are several known control apparatus for a motorcycle having a controller for controlling an optical axis or the like based on a tilt angle of a vehicle (motorcycle) body determined by a tilt angle detecting apparatus.

An example of such a tilt-angle detecting apparatus for a motorcycle is disclosed in the Japanese Unexamined Patent Application Publication No. Hei 5-208635. The disclosed tilt-angle detecting apparatus is mounted on a motorcycle equipped with relatively wide tires, in which a point of contact between the tire and the ground is shifted in a width direction of a vehicle (motorcycle) body in response to the banking of the vehicle body, i.e., tilting in the width direction of the vehicle body.

This known tilt-angle detecting apparatus, having an acceleration sensor, detects the acceleration in the width direction of the vehicle body. The tilt angle is detected by checking the acceleration thus detected, compliant to a correspondence table of acceleration and tilt angle, which has been prepared in advance.

According to the Japanese Unexamined Patent Application Publication No. Hei 5-208635, the tilt angle is obtained based on unique acceleration in the width direction of the vehicle body. Such method of determining a tilt angle of the motorcycle, however, has its own drawbacks.

For example, while turning the vehicle to the right, when a driver of the motorcycle decides to quickly turn to the left, the acceleration in the width direction of the vehicle body shows a high value even when the motorcycle is at an upright position. This results in an erroneous determination that the motorcycle is tilting (leaning). In particular, the changes of tilt angle in every moment may probably result in a calculation of a tilt angle with lower precision.

Incidentally, it is well known that the tilt angle of a motorcycle is determined as a function of three unknown variables: a steering angle, a vehicle speed, and a turning radius of the motorcycle. Here, in the given example of the Japanese Unexamined Patent Application Publication No. Hei 5-208635 it is difficult to obtain a precise turning radius while the motorcycle is traveling, when while turning the motorcycle to the left, the driver quickly decides to turn the motorcycle to the right. Accordingly, it is desirable to provide a high precision tilt-angle detecting apparatus which employs a simplified method of arithmetic operations for more precisely calculating a tilt of the vehicle, and which is capable of dealing with a wide range of running conditions of the vehicle during operation thereof.

The present invention has been made to overcome such drawbacks. Accordingly, it is one of the objects of the present invention to provide a tilt-angle detecting apparatus for a motorcycle for more precisely calculating a tilt angle of the vehicle body using a simplified method of arithmetic operations.

SUMMARY OF THE INVENTION

In order to achieve above objects, the present invention according to a first aspect thereof provides a tilt-angle detecting apparatus for a motorcycle. The tilt-angle detecting apparatus includes a steering angle sensor for detecting a turning angle, a vehicle speed sensor (also referred as vehicle-velocity sensor) for detecting a current speed (velocity) of the motorcycle, and a turning-radius calculation unit for calculating a turning radius corresponding to the steering angle detected by the steering-angle sensor. The calculation of the turning radius is based on previously actually measured values of a steering angle and a turning radius, that is, a relationship between steering angle and the turning radius is established in advance, based on actually measured values thereof.

In addition, the first aspect is characterized in that a base tilt angle calculation unit is provided for obtaining the tilt angle of the vehicle body at a regular turning. The calculation of the tilt angle is based on the turning radius calculated by the turning-radius calculation unit and a vehicle speed detected by the vehicle speed sensor.

The present invention according a second aspect thereof is characterized in that the turning-radius calculation unit includes one of a map and a function of steering angle vs. turning radius. The map and the function providing a relationship between the steering angle and the turning radius are determined in advance. In addition, the second aspect is characterized in that the turning radius is obtained by either searching the map or by using the function, and by using the tilt angle calculated by the tilt-angle calculating unit.

The present invention according to a third aspect thereof is characterized in that the tilt-angle calculation unit includes one of a map and a function of vehicle speed vs. tilt angle. The map and the function include a determined relationship among the turning radius, the vehicle speed, and the tilt angle of the vehicle body. In addition, the tilt angle of the vehicle body is obtained by either searching the map and using the function, or by using both the turning radius calculated by the turning-radius calculation unit and the vehicle speed detected by the vehicle speed sensor.

A fourth aspect of the present invention is characterized by including a steering-angle variation determination unit for determining whether the variation of the steering angle is equal to or greater than a predetermined value. Also included is a transient tilt-angle calculation unit for calculating the tilt angle of the vehicle body at a transient turning. The calculation is performed when the steering-angle variation determination unit determines that the variation of the steering angle is equal to or greater than the predetermined value. The tilt angle of the vehicle body at a regular turning calculated by the tilt-angle calculation unit is corrected based on the steering angle, the variation of the steering angle, and the vehicle speed.

A fifth aspect of the present invention is characterized by further including a steering-angle variation determination unit for determining whether the variation of the steering angle is equal to or greater than a predetermined value. Also included is an acceleration sensor for detecting the acceleration produced in the width direction of the vehicle body. The detection is performed when the steering-angle variation determination unit determines that the variation of the steering angle is less than the predetermined value. In addition, the fourth aspect is characterized by further including an acceleration calculation unit for calculating the acceleration produced in the width direction of the vehicle body based on the turning radius calculated by the turning-radius calculation unit and based on the vehicle speed detected by the vehicle speed sensor. Moreover, the fourth aspect is characterized by further including a corrected transient tilt-angle calculation unit for calculating the tilt angle of the vehicle body at a transient turning. The tilt angle of the vehicle body at a constant amount of turning, calculated by the first tilt-angle calculation unit, is corrected based on the difference between the acceleration calculated by the acceleration calculation unit and the acceleration detected by the acceleration sensor.

EFFECTS OF THE INVENTION

According to the first aspect of the present invention, the turning radius is estimated based on the steering angle, and the tilt angle of the vehicle body at a constant degree of turning is obtained based on the vehicle speed and the turning radius. The steering angle and the vehicle speed are inputted, the tilt angle of the vehicle body is calculated by use of the steering angle, the vehicle speed, and the turning radius as factors.

This makes it possible to detect the tilt angle of the vehicle body with high precision. In addition, both the vehicle speed and the steering angle are detected by use of a vehicle speed sensor and a steering-angle sensor, both of which are provided for use on a common motorcycle. Accordingly, even the conventional system can sufficiently adapt itself to the first aspect of the present invention.

According to the second and the third aspects of the present invention, the turning radius can be obtained by referring to the steering angle, and the tilt angle of the vehicle body can be obtained based on the turning radius and the vehicle speed. For this purpose, either the map or the function can be employed.

According to the fourth aspect of the present invention, whether the turning that is going on at the moment is a transient turning in which the steering angle is varying can be determined by comparing the variation of the steering angle with the predetermined value. In addition, in the case of a transient turning, the tilt angle of the vehicle body can be corrected in accordance with the variation of the steering angle even after the tilt angle at the transient turning has been calculated once.

According to the fifth aspect of the present invention, in a case of a transient turning with a small variation of the steering angle, the tilt angle of the vehicle body at the regular turning can be corrected, irrespective of the steering angle, in accordance with the variation in the acceleration in the width direction of the vehicle body.

For a more complete understanding of the present invention, the reader is referred to the following detailed description section, which should be read in conjunction with the accompanying drawings.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
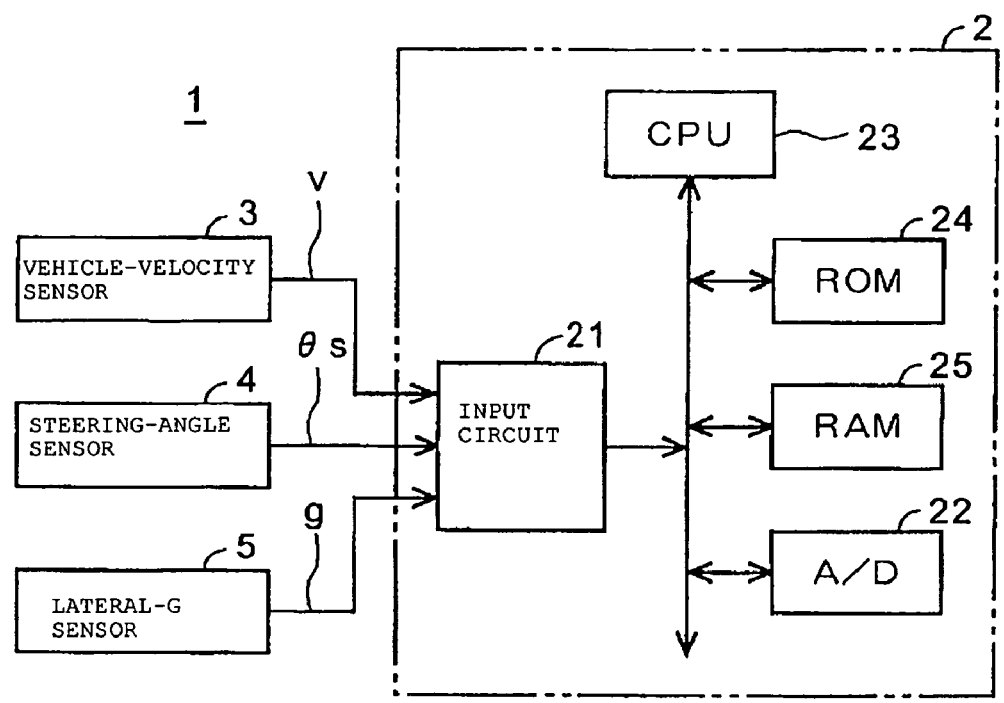
FIG. 1 is a system configuration diagram of the tilt-angle detecting apparatus according to an illustrative embodiment of the present invention.

Hereafter, an illustrative embodiment of the present invention is discussed with reference to the drawings. FIG. 1 is a system configuration diagram of a tilt-angle detecting apparatus according to an illustrative embodiment of the present invention.

As shown in FIG. 1, a tilt-angle detecting apparatus 1 includes a tilt angle ECU 2 (hereafter referred as an ECU 2), a vehicle speed sensor 3 (also referred as vehicle-velocity sensor), a steering-angle sensor 4 and a lateral-G sensor 5. The lateral-G sensor 5 is operable to detect acceleration of the vehicle in a lateral (width) direction of the vehicle.

The ECU 2 includes an input circuit 21, an A/D converter 22, a microcomputer 23 (also referred as a CPU 23), and a plurality of memory devices, such as a ROM 24 and a RAM 25. The input circuit 21 includes a filter circuit to filter out (remove) a high-frequency component from the detected signals of a vehicle speed v, a steering angle θs, and an acceleration in the vehicle width direction g (hereafter referred as the lateral acceleration g).

The CPU 23 performs arithmetic, analytical and logical operations to estimate a current instantaneous tilt angle of the motorcycle. The CPU 23 uses detected signals of vehicle speed v, steering angle θs, and lateral acceleration g, all inputted through the input circuit 21. In addition, the CPU 23 uses programs and data stored in the memory devices ROM 24, and RAM 25.

The arithmetic-operation procedure for calculating a tilt angle of motorcycle is described with reference to a flowchart of FIG. 2.

Figure 2:
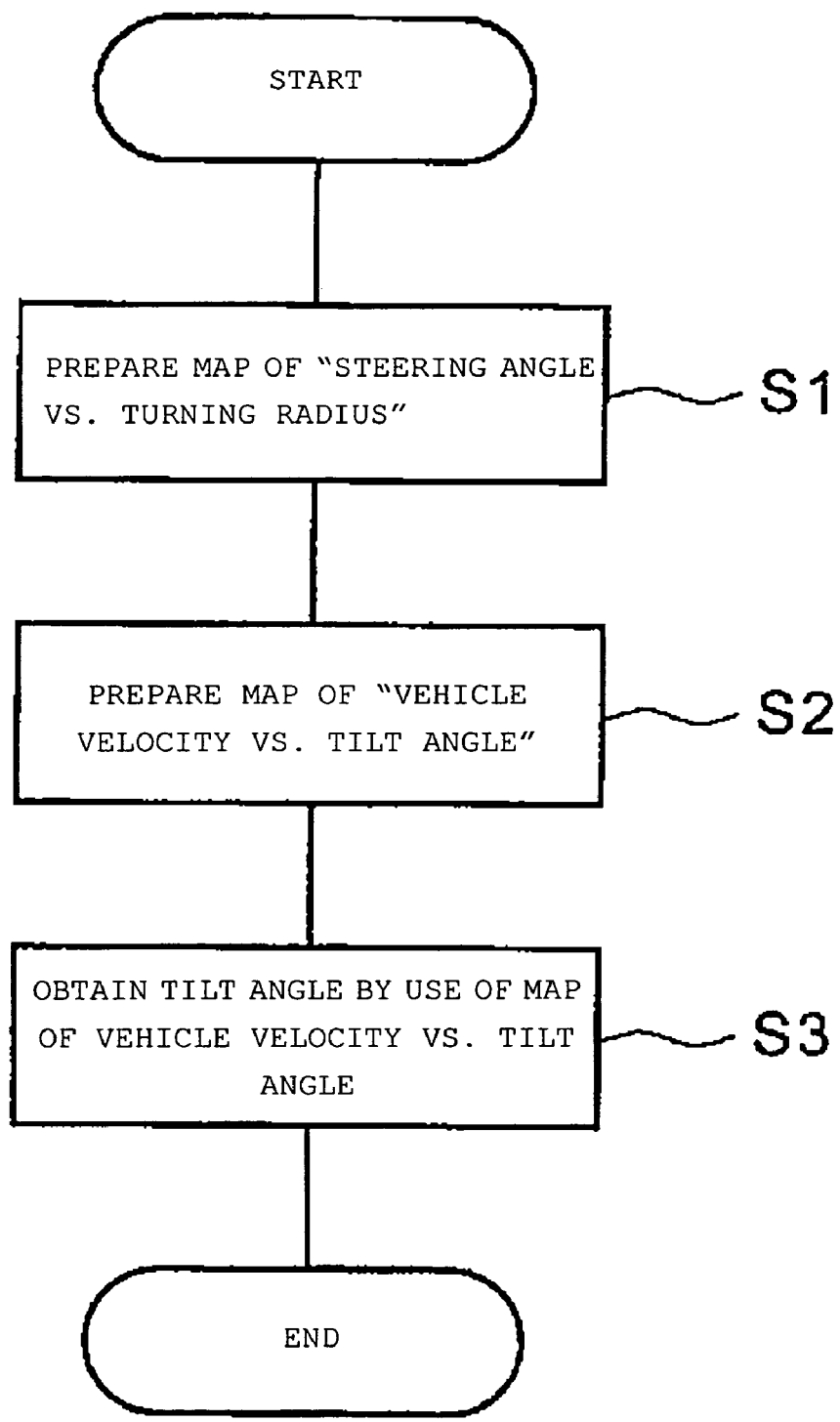
FIG. 2 is a representative flowchart showing an overall operation of the tilt-angle detecting apparatus.

As shown in FIG. 2, firstly, at step S1, prior to the arithmetic operation procedure performed by the ECU 2, a map of "steering angle vs. turning radius", having a defined relationship between steering angles and corresponding values of turning radii, is prepared by actually measuring the turning radius rs corresponding to each steering angle θs. The map thus prepared is then stored in the ROM 24. A function (formula) may also be derived to permit calculation of turning radius as a function of steering angle, based on the actually measured corresponding values of the turning radii and steering angle.

At step S2, a map of 'vehicle speed vs. tilt angle' is prepared by arithmetically relating the relationship between base tilt angle θbs and the vehicle speed v, obtained by using a parameter of the turning radius rs. The map thus prepared is then stored in the ROM 24.

At step S3, the map of "vehicle speed vs. tilt angle" is searched by use of the vehicle speed v detected by the vehicle speed sensor 3, and thus the base tilt angle θbs is obtained.

The base tilt angle θbs obtained in accordance with the above-described procedure is a regular (steady-state) tilt angle, which is a value obtained by an arithmetic operation for the tilt angle of the vehicle body when operated at a normal turning condition, with its steering angle θs and the turning radius rs varying substantially little during a turn.

When the motorcycle changes the turning radius rs so as to adapt itself to the curvature of the road, the steering angle θs varies. Accordingly, in a case of the transient time, that is, when the steering angle θs varies to a large extent, the turning radius rs and the tilt angle θs of the vehicle body have to be corrected in accordance with the procedure to be described later.

Figure 3:
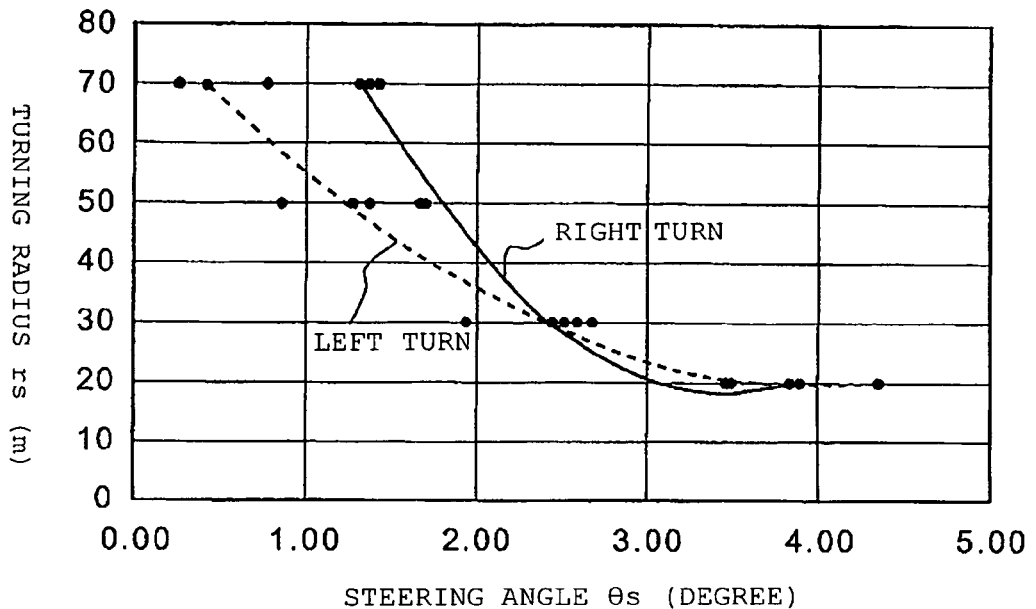
FIG. 3 is a chart showing an exemplary map of "steering angle vs. turning radius".

FIG. 3 is a chart showing an exemplar map of "tilt angle vs. turning radius". In this map, a graph of tilt angle vs. turning radius for a right turn is represented by a solid line, and a graph of a tilt angle vs. turning radius for a left turn is represented by a dotted line. The steering angle θs is on the horizontal axis while the turning radius rs is on the vertical axis. There are differences in the turning radius rs among different types of motorcycle vehicles. For example, the wheelbase and the body weight are some of the factors that generally produce the above-mentioned differences. Accordingly, a relational map is prepared, or a function is derived, for each of the different types of vehicles, by establishing the relationship between the estimated turning radius rs (m) and the steering angle θs (degree).

FIG. 3 shows an exemplar case where the motorcycle is operated to travel at an approximately constant vehicle speed v with a turning radius rs having a fixed value. For example, with a particular vehicle, the steering angle θs is measured multiple times while the motorcycle is operated to travel a course of 20-m turning radius at a velocity of 20 km/h to 40 km/h. The average value of these steering angles θs is determined to be the steering angle θs for the 20-m turning radius.

Similarly, the steering angle θs is measured multiple times while the motorcycle is operated to travel courses respectively of 30-m, 50-m, and 70-m turning radii at a velocity of 20 km/h to 40 km/h. The average values of the respective steering angles θs are established to be the steering angles θs for the 30-m, 50-m, and 70-m turning radii, respectively. The map of "steering angle vs. turning radius" is prepared by use of the measured values of the turning radius rs as well as by using supplemental values.

It may be noted that the turning radius is often different for the right turn and the left turn. Therefore, the maps are required to be prepared in advance for both the right and left turns by way of actual measuring.

Figure 4:
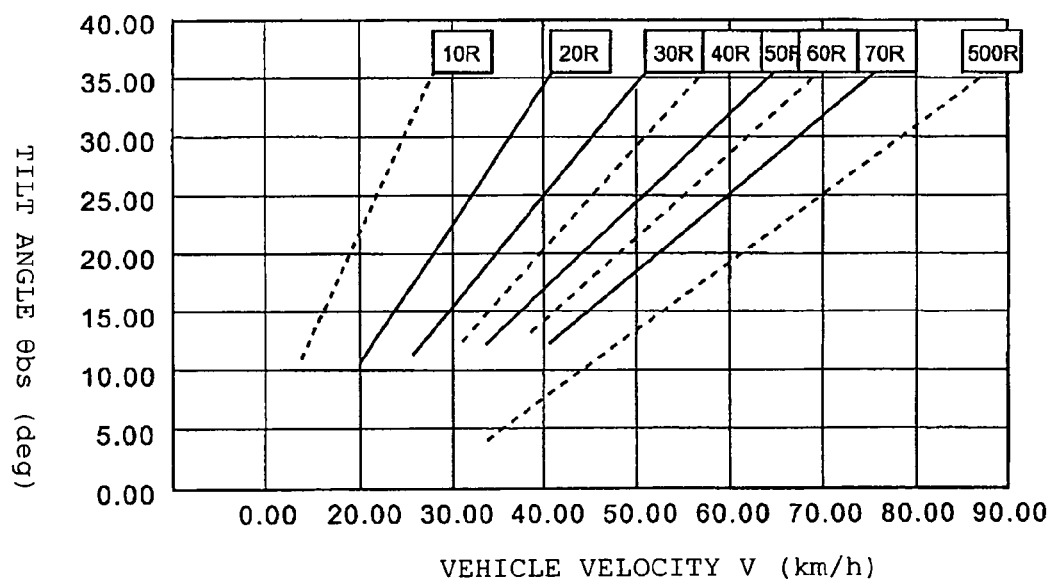
FIG. 4 is a chart showing an exemplary map of "vehicle speed vs. tilt angle".

FIG. 4 is a chart showing an exemplar map of "vehicle speed vs. tilt angle" for different values of turning radii. It may be noted that FIG. 4 shows the actually measured values when a motorcycle is operated making only right turns. The tilt angle θbs is measured when the motorcycle equipped with a tilt angle sensor is operated to travel with its vehicle speed v and the turning radius rs being determined. This measurement is conducted for each turning radius rs with the vehicle speed v being varied. Again, it may be noted that traveling straight is considered as equivalent to traveling a course with a 500-m turning radius.

Figure 5:
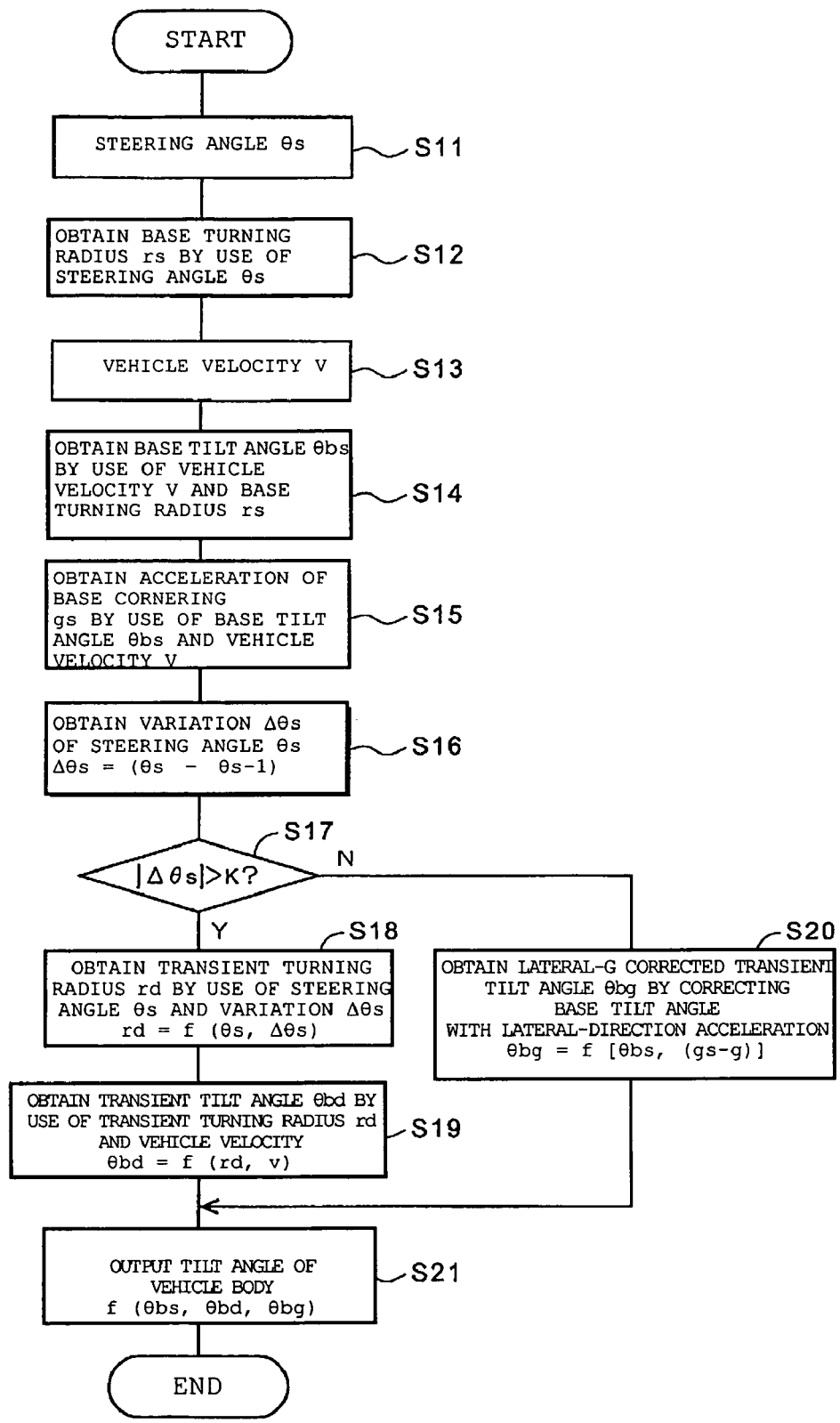
FIG. 5 is a flowchart showing an operation of the tilt-angle detecting apparatus.

More detailed descriptions are provided with reference to a flowchart shown in FIG. 5, as to the procedure of arithmetic operation for the tilt angle by use of the above-described maps shown in FIGS. 3 and 4.

As shown in FIG. 5, firstly at step S11, the steering angle θs is read from the steering-angle sensor 4. Then, at step S12, the steering angle θs thus read is used to search the map of "steering angle vs. turning radius," and thus the turning radius rs is obtained. In other words, arithmetical operations (e.g., correlating a measured value of a steering angle with a stored value relating the steering angle and an associated turning radius) are performed for determining the turning radius rs as a function of the steering angle θs.

At step S13, the vehicle speed v is read from the vehicle speed sensor 3. At step S14, the vehicle speed thus read (detected) and the turning radius rs, as previously determined, are used to search the map of "vehicle speed vs. tilt angle", and thus the base tilt angle θbs is obtained. In other words, arithmetical operations (correlating corresponding values) are performed for the base tilt angle θbs as a function of the vehicle speed v and as a function of the turning radius rs. The steps S11 to S14 are included in the procedure of the arithmetic operation for determining the tilt angle on the assumption that the motorcycle is turning at a temporary steady-state condition.

At step S15, the regular turning acceleration gs (i.e., lateral-direction acceleration gs) is calculated based on the base tilt angle θbs and the vehicle speed v.

At step S16, the variation Δθs of the steering angle θs (steering angle differentiation) is calculated. In other words, the difference is calculated between the steering angle θs−1 stored at the detection during the immediately preceding processing and the steering angle θs detected in the present processing.

At step S17, whether or not the variation Δθs of the steering angle θs is greater than a predetermined value K is determined. When the variation Δθs is greater than the predetermined value K, it is assumed that the turning is not steady-state but instead, is transient. Then, the operational flow proceeds to step S18.

At step S18, the transient turning radius rd is obtained based on the steering angle θs and the variation Δθs of the steering angle θs. For example, to begin with, the turning radius rs is obtained by referring to the map or a function of "steering angle vs. turning radius", using a detected (obtained by monitoring a steering angle sensor) steering angle θs.

Then, the base tilt angle θbs is obtained by searching the map or a function of "vehicle speed vs. the tilt angle" using the turning radius rs obtained previously and the vehicle speed v. Subsequently, the transient turning radius rd is obtained by adding a correction value, which is determined in advance, in response to the variation Δθs of the steering angle θs.

For example, the correction value is determined so as to make it possible to detect a greater tilt angle when the steering angle θs varies, to a great extent, in the positive direction (that is, when the motorcycle is approaching a sharper curve). Meanwhile, the correction value is set so as to make it possible to detect a smaller tilt angle when the steering angle θs varies to a great extent, in the negative direction (that is, when, as a result of the change, the motorcycle is traveling more straight).

At step S19, the transient tilt angle θbd is calculated based on the transient turning radius rd and the vehicle speed v.

When at step 17, if it is determined that the variation Δθs of the steering angle θs is less than the predetermined value K, the operational flow proceeds to step S20. At step S20, the lateral-G corrected transient tilt angle θbg is calculated by correcting the estimated, base tilt angle θbs using the lateral-direction acceleration. In other words, the lateral-G corrected transient tilt angle θbg is calculated as a function of the base tilt angle θbs and the difference between lateral-direction acceleration gs calculated at step S14 and the lateral-direction acceleration g detected by the lateral-G sensor, i.e., the difference: gs−g. In other words, θbg=f[(θbs, gs−g)].

It may be noted that when the steering angle θs varies only slightly, the steering-angle sensor 4 is not capable of detecting steering angle θs with precision during a transient turning. The lateral-direction acceleration, however, can be detected with precision by use of the lateral-G sensor 5. Accordingly, the base tilt angle θbs is corrected in accordance with the variation (gs−g) of the lateral-direction acceleration, and thus the tilt angle of the vehicle body at a transient turning, which causes a slight variation of the steering angle, is obtained.

For example, when the lateral-direction acceleration is increased, the function is determined so as to make the calculated lateral-G corrected transient tilt angle θbg greater. Conversely, when the lateral-direction acceleration is decreased, the function is determined so as to make the calculated lateral-G corrected transient tilt angle θbg smaller.

Cases of a decreased (having smaller value) turning radius rs, and an increased vehicle speed v are conceivable as a condition for the traveling with a large tilt angle. In both cases, the lateral-direction acceleration becomes greater, so that it is possible to perform the transient correction by paying attention to the correlation between the lateral-direction acceleration and the tilt angle of the vehicle body.

At step S21, the tilt angles θbs, θbd, and θbg, which are calculated respectively at steps S14, S18 and S19, are arithmetically weighted, and thus outputted is the final tilt angle of the vehicle body as a function of the tilt angles θbs, θbd, and θbg. It is preferable that such arithmetic weighting is based on the statistic results of the traveling environment, the turning radius, the traveling conditions and the like in general public roads.

Figure 6:
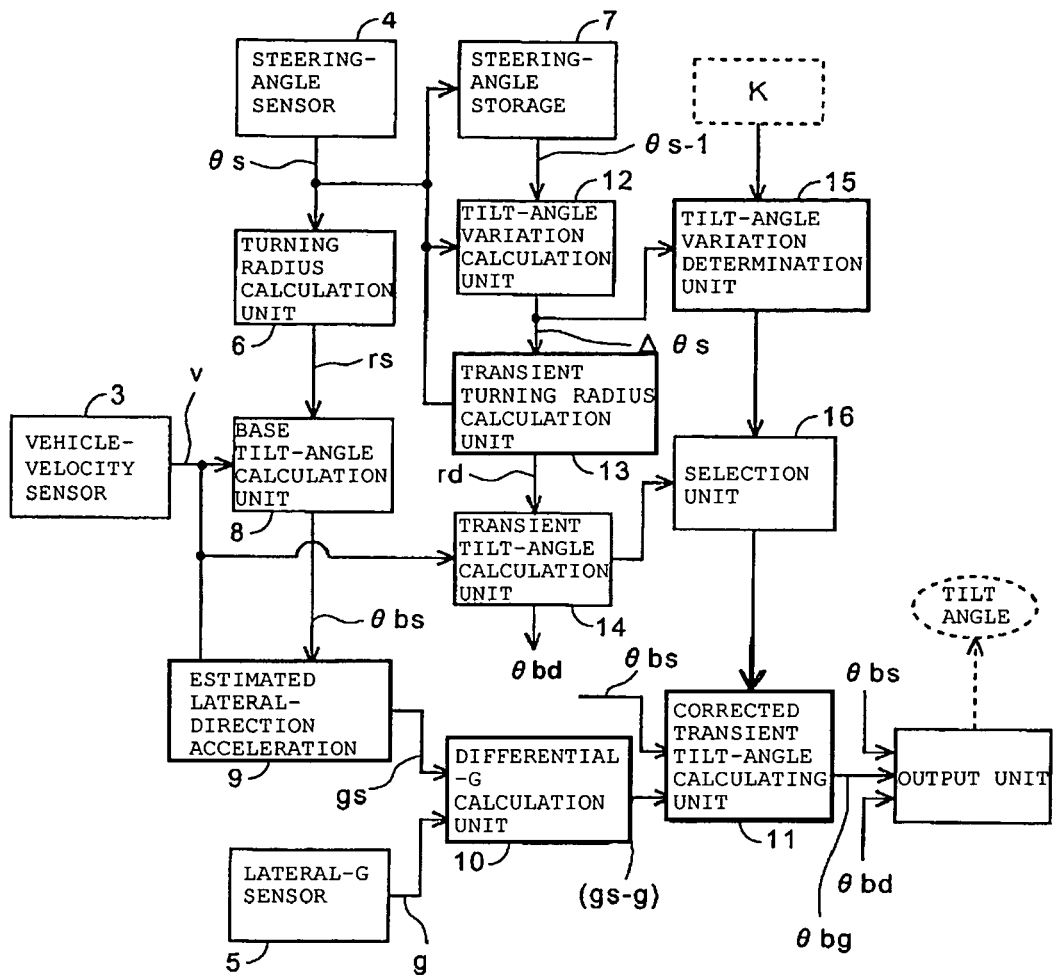
FIG. 6 is a block diagram showing the functions of principal portions of a tilt-angle detecting apparatus according to the illustrative embodiment.

FIG. 6 is a block diagram showing functions of the ECU 2 used to detect the tilt angle according to this embodiment. In FIG. 6, a turning-radius calculation unit 6 is provided to calculate the turning radius rs based on the steering angle θs detected by the steering-angle sensor 4. The turning radius rs may be obtained by use of a map, as discussed above, or by use of a function (formula) based on the relationship between the turning radius rs and the steering angle θs obtained in advance by actual measurement. In addition, the detection output of the steering-angle sensor 4 is inputted into a steering angle storage area 7, and is stored as a previously detected steering angle θs−1.

A base tilt angle calculation unit 8 is provided to calculate the estimated base tilt angle θbs based on the estimated turning radius rs and the vehicle speed v detected by the vehicle speed sensor 3. The estimated base tilt angle θbs may be obtained by using a map, as discussed above, or by use of a function formula that is based on the relationship among the estimated base tilt angle θbs (obtained in advance by actual measurement), the turning radius rs, and the vehicle speed v.

An estimated lateral-direction acceleration calculation unit 9 is provided to estimate the lateral-direction acceleration gs based on the vehicle speed v and the base tilt angle θbs.

A differential-G calculation unit 10 is provided to calculate the difference between the lateral-direction acceleration g detected by the lateral-G sensor 5 and the estimated lateral-direction acceleration gs.

A transient tilt angle calculating unit 11 is provided to calculate the lateral-G corrected transient tilt angle θbg based on the base tilt angle θbs (obtained via the tilt angle calculator) and the difference between lateral-direction accelerations (gs−g).

A tilt angle variation calculation unit 12 is provided to calculate the tilt angle variation Δθs from the difference between the steering angle θs detected at a given present time and the steering angle θs−1 having been detected at a previous time.

A transient turning radius calculation unit 13 is provided to calculate the estimated transient turning radius rd based on the steering angle θs and the variation Δθs of the steering angle θs.

A transient tilt-angle calculation unit 14 is provided to calculate the transient tilt angle θbd based on the transient turning radius rd and the vehicle speed v.

A tilt angle variation determination unit 15 compares the variation Δθs of the steering angle θs and the predetermined value K. The result of this comparison is inputted into the selection unit 16. The selection unit 16 energizes the transient tilt-angle calculation unit 14 when the variation Δθs of the steering angle θs is greater than the predetermined value K. Conversely, the selection unit 16 energizes the transient tilt angle calculating unit 11 when the variation Δθs of the steering angle θs is less than the predetermined value K.

An output unit 17 is provided to weight the base tilt angle θbs, the transient tilt angle θbd, and the lateral-G corrected transient tilt angle θbg, and to output the calculation result of the tilt angle for the vehicle body. In other words, the output unit calculates weighted average of base tilt angle θbs, the transient tilt angle θbd and lateral-G corrected transient tilt angle θbg, and outputs the tilt angle (having a precise value, which is desirable) for the vehicle body.

The present invention has been described thus far in accordance with a best mode of implementing the invention, but the descriptions thus far made are not the only embodiment of the present invention. Various modifications can be made by those skilled in the art. During the turning of a motorcycle, the rider laterally inclines his/her driving posture or laterally shifts his or her body so as to obtain the tilting of the vehicle body. In this event, the steering angle varies in relation to the tilt angle of the vehicle body. In addition, the variation of the steering angle varies in response to the vehicle speed even with the same turning radius.

In other words, the tilt angle is a function with three unknown factors: the steering angle, the vehicle speed, and the turning radius. Based on this correlation, the turning radius is firstly obtained in accordance with the steering angle. Then, the tilt angle is obtained based on the thus obtained turning radius and based on the vehicle speed. The tilt angle thus obtained is the tilt angle at the regular turning. So, for the transient turning, the turning radius is corrected by use of the variation of the steering angle and the variation of the lateral-direction acceleration. These are the procedure needed in this embodiment.

Accordingly, if, for example, a highly-precise steering-angle sensor is available, the lateral-G sensor can be eliminated. In this case, the tilt angle at a regular turning can be corrected by use of the steering angle variation so as to obtain the tilt angle valid for the transient turning in general.

In the above-described embodiment, the relationship between the steering angle and the turning radius has been determined in advance and set up in a map. This is not the only form of the present invention. The relationship between the steering angle and the turning radius can be determined as a function formula in advance, and the turning radius may be obtained from the steering angle by an arithmetic operation using the function formula.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A tilt-angle detecting apparatus for a motorcycle, said apparatus comprising:
   a steering-angle sensor for detecting a steering angle of the motorcycle;
   a vehicle speed sensor for detecting a vehicle speed;
   a turning-radius calculation unit for calculating a turning radius corresponding to a steering angle detected by the steering-angle sensor, wherein said turning radius is determined based on a predetermined relationship between measured steering angle values and turning radius; and
   a tilt-angle calculation unit for obtaining a tilt angle of a vehicle body during a regular turning of the motorcycle, wherein said tilt angle is calculated based on the turning radius calculated by the turning-radius calculation unit and the vehicle speed detected by the vehicle speed sensor;
   wherein the turning-radius calculation unit includes one of a map and a function of steering angle vs. turning radius, the map and the function each representing a predetermined relationship between the steering angle and the turning radius;
   and wherein the turning radius is obtained either by searching the map of steering angle vs. turning radius or by using the function of steering angle vs. turning radius, and the tilt angle calculated by the tilt-angle calculating unit is used for searching the map or for using the function.

2. A tilt-angle detecting apparatus for a motorcycle according to claim 1,
   wherein the tilt-angle calculation unit includes either a map of vehicle speed vs. tilt angle or a function of vehicle speed vs. tilt angle,
   wherein the map and the function each represent a predetermined relationship among the turning radius, the vehicle speed, and the tilt angle of the vehicle body; and
   wherein the tilt angle of the vehicle body is obtained either by searching the map or by using the function, and wherein both the turning radius calculated by the turning-radius calculation unit and the vehicle speed detected by the vehicle speed sensor are used for searching the map or for using the function.

3. A tilt-angle detecting apparatus for a motorcycle according to claim 1, further comprising:
   a steering-angle variation calculation unit for calculating the variation of steering angle detected by the steering-angle sensor;
   a steering-angle variation determination unit for determining whether the variation of the steering angle is equal to or greater than a predetermined value; and
   a transient tilt-angle calculation unit for calculating the tilt angle of the vehicle body at a transient turning, the calculation of the transient tilt-angle being performed when the steering-angle variation determination unit determines that the variation of the steering angle is equal to or greater than the predetermined value,
   wherein the tilt angle of the vehicle body at a regular turning calculated by the tilt-angle calculation unit is corrected based on the steering angle, the variation of the steering angle, and the vehicle speed.

4. A tilt-angle detecting apparatus for a motorcycle according to claim 1, further comprising:
   a steering-angle variation calculation unit for calculating the variation of steering angle detected by the steering-angle sensor;
   a steering-angle variation determination unit for determining whether the variation of the steering angle is equal to or greater than a predetermined value;
   an acceleration sensor for detecting the acceleration produced in a width direction of the vehicle body, the detection of the acceleration being performed when the steering-angle variation determination unit determines that the variation of the steering angle is less than the predetermined value;
   an acceleration calculation unit for calculating the acceleration produced in the width direction of the vehicle body based on the turning radius calculated by the turning-radius calculation unit and based on the vehicle speed detected by the vehicle speed sensor; and
   a transient tilt-angle calculation unit for calculating the tilt angle of the vehicle body at a transient turning, the tilt angle of the vehicle body at a regular turning calculated by the tilt-angle calculation unit being corrected based on the difference between the acceleration calculated by the acceleration calculation unit and the acceleration detected by the acceleration sensor.

5. A tilt-angle detecting apparatus for a motorcycle according to claim 1, further comprising:
   a steering-angle variation calculation unit for calculating the variation of steering angle detected by the steering-angle sensor;
   a steering-angle variation determination unit for determining whether the variation of the steering angle is equal to or greater than a predetermined value;
   an acceleration sensor for detecting the acceleration produced in a width direction of the vehicle body, the detection of the acceleration being performed when the steering-angle variation determination unit determines that the variation of the steering angle is less than the predetermined value;
   an acceleration calculation unit for calculating the acceleration produced in the width direction of the vehicle body based on the turning radius calculated by the turning-radius calculation unit and based on the vehicle speed detected by the vehicle speed sensor; and
   a transient tilt-angle calculation unit for calculating the tilt angle of the vehicle body at a transient turning, the tilt angle of the vehicle body at a regular turning calculated by the tilt-angle calculation unit being corrected based on the difference between the acceleration calculated by the acceleration calculation unit and the acceleration detected by the acceleration sensor;
   and an output unit for calculating a weighted average of the base tilt-angle, the transient tilt-angle, and a corrected-transient tilt angle; wherein said weighted average is a final tilt angle for the vehicle body.

6. A tilt-angle detecting apparatus for a motorcycle, said apparatus comprising:
   a steering-angle sensor for detecting a steering angle of the motorcycle;
   a vehicle speed sensor for detecting a vehicle speed;
   a turning-radius calculation unit for calculating a turning radius corresponding to a steering angle detected by the steering-angle sensor, wherein said turning radius is determined based on a predetermined relationship between measured steering angle values and turning radius; and a tilt-angle calculation unit for obtaining a tilt angle of a vehicle body during a regular turning of the motorcycle, wherein said tilt angle is calculated based on the turning radius calculated by the turning-radius calculation unit and the vehicle speed detected by the vehicle speed sensor;

wherein the tilt-angle calculation unit includes one of a map of vehicle speed vs. tilt angle and a function of vehicle speed vs. tilt angle, the map and the function each representing a predetermined relationship among the turning radius, the vehicle speed, and the tilt angle of the vehicle body;

and wherein the tilt angle of the vehicle body is obtained either by searching the map or by using the function, and both the turning radius calculated by the turning-radius calculation unit and the vehicle speed detected by the vehicle speed sensor are used for searching the map or for using the function.

7. A tilt-angle detecting apparatus for a motorcycle according to claim 6, further comprising:

a steering-angle variation calculation unit for calculating the variation of steering angle detected by the steering-angle sensor;

a steering-angle variation determination unit for determining whether the variation of the steering angle is equal to or greater than a predetermined value; and a transient tilt-angle calculation unit for calculating the tilt angle of the vehicle body at a transient turning, the calculation of the transient tilt-angle being performed when the steering-angle variation determination unit determines that the variation of the steering angle is equal to or greater than the predetermined value, wherein the tilt angle of the vehicle body at a regular turning calculated by the tilt-angle calculation unit is corrected based on the steering angle, the variation of the steering angle, and the vehicle speed.

8. A tilt-angle detecting apparatus for a motorcycle according to claim 6, further comprising:

a steering-angle variation calculation unit for calculating the variation of steering angle detected by the steering-angle sensor;

a steering-angle variation determination unit for determining whether the variation of the steering angle is equal to or greater than a predetermined value; and a transient tilt-angle calculation unit for calculating the tilt angle of the vehicle body at a transient turning, the calculation of the transient tilt-angle being performed when the steering-angle variation determination unit determines that the variation of the steering angle is equal to or greater than the predetermined value, wherein the tilt angle of the vehicle body at a regular turning calculated by the tilt-angle calculation unit is corrected based on the steering angle, the variation of the steering angle, and the vehicle speed;

and further comprising an output unit for calculating a weighted average of the base tilt angle, the transient tilt-angle, and a corrected-transient tilt angle, wherein said weighted average is a final tilt angle for the vehicle body.

9. A tilt-angle detecting apparatus for a motorcycle according to claim 6, further comprising:

a steering-angle variation calculation unit for calculating the variation of steering angle detected by the steering-angle sensor;

a steering-angle variation determination unit for determining whether the variation of the steering angle is equal to or greater than a predetermined value;

an acceleration sensor for detecting the acceleration produced in a width direction of the vehicle body, the detection of the acceleration being performed when the steering-angle variation determination unit determines that the variation of the steering angle is less than the predetermined value;

an acceleration calculation unit for calculating the acceleration produced in the width direction of the vehicle body based on the turning radius calculated by the turning-radius calculation unit and based on the vehicle speed detected by the vehicle speed sensor; and a transient tilt-angle calculation unit for calculating the tilt angle of the vehicle body at a transient turning, the tilt angle of the vehicle body at a regular turning calculated by the tilt-angle calculation unit being corrected based on the difference between the acceleration calculated by the acceleration calculation unit and the acceleration detected by the acceleration sensor.

10. A tilt-angle detecting apparatus for a motorcycle, comprising:

a steering-angle sensor for detecting a steering angle of the motorcycle;

a vehicle speed sensor for detecting a vehicle speed;

a regular turning-radius calculation unit for calculating a turning radius corresponding to a steering angle detected by the steering-angle sensor, wherein said turning radius is determined based on a predetermined relationship between measured steering angle values and turning radius;

a base tilt angle calculation unit for obtaining a tilt angle of a vehicle body at a regular turning of the motorcycle, wherein said tilt angle is calculated based on the steady state turning radius calculated by the a regular turning-radius calculation unit;

a steering-angle variation calculation unit for calculating the variation of steering angle detected by the steering-angle sensor;

a steering-angle variation determination unit for determining whether the variation of the steering angle is equal to or greater than a predetermined value; and a lateral-G sensor for detecting the acceleration produced in a width direction of the vehicle body, the detection of the acceleration being performed when the steering-angle variation determination unit determines that the variation of the steering angle is less than the predetermined value.

11. A tilt-angle detecting apparatus for a motorcycle according to claim 10, further comprising an acceleration calculation unit for calculating the acceleration produced in the width direction of the vehicle body based on the turning radius calculated by the turning-radius calculation unit and the vehicle speed detected by the vehicle speed sensor; and a transient tilt-angle calculation unit for calculating a corrected-transient tilt angle of the vehicle body at a transient turning, wherein the tilt angle of the vehicle body at a regular turning calculated by the tilt-angle calculation unit is corrected based on the difference between the acceleration calculated by the acceleration calculation unit and the acceleration detected by the acceleration sensor.

12. A tilt-angle detecting apparatus for a motorcycle according to claim 11, further comprising an output unit for calculating a weighted average of the base tilt angle, the transient tilt-angle, and a corrected-transient tilt angle; wherein said weighted average is a final tilt angle for the vehicle body.

13. A tilt-angle detecting apparatus for a motorcycle according to claim 10, wherein
the regular turning-radius calculation unit includes one of a map and a function of steering angle vs. turning radius, the map and the function each representing the predetermined relationship between the steering angle and the turning radius; and
the turning radius is obtained by one of searching the map of steering angle vs. turning radius and using the function of steering angle vs. turning radius, and the tilt angle calculated by the tilt-angle calculating unit is used for searching the map or for using the function.

14. A tilt-angle detecting apparatus for a motorcycle according to claim 10, further comprising
a transient tilt-angle calculation unit for calculating the tilt angle of the vehicle body at a transient turning, the calculation of the transient tilt-angle being performed when the steering-angle variation determination unit determines that the variation of the steering angle is equal to or greater than the predetermined value;
wherein the tilt angle of the vehicle body at a regular turning calculated by the tilt-angle calculation unit is corrected based on the steering angle, the variation of the steering angle, and the vehicle speed.

* * * * *